US009249827B2

(12) United States Patent
Serocki et al.

(10) Patent No.: US 9,249,827 B2
(45) Date of Patent: *Feb. 2, 2016

(54) HINGE EMPLOYING A RATCHET FOR AN UPHOLSTERY SEAT

(71) Applicants: Philip J. Serocki, Sparta, TN (US); Samuel D. Dwello, Casselberry, FL (US)

(72) Inventors: Philip J. Serocki, Sparta, TN (US); Samuel D. Dwello, Casselberry, FL (US)

(73) Assignee: Taco Metals, Inc., Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/531,917

(22) Filed: Nov. 3, 2014

(65) Prior Publication Data

US 2015/0176640 A1    Jun. 25, 2015

Related U.S. Application Data (63) Continuation-in-part of application No. 14/138,435, filed on Dec. 23, 2013, now Pat. No. 8,875,347.

(51) Int. Cl.
| *F16C 11/10* | (2006.01) |
| *B63B 29/04* | (2006.01) |
| *B60N 2/22* | (2006.01) |
| *B60N 2/235* | (2006.01) |
| *B60N 2/24* | (2006.01) |

(52) U.S. Cl.
CPC ............... *F16C 11/10* (2013.01); *B60N 2/224* (2013.01); *B60N 2/2352* (2013.01); *B60N 2/24* (2013.01); *B63B 29/04* (2013.01); *B63B 2029/043* (2013.01); *Y10T 16/541* (2015.01); *Y10T 16/54024* (2015.01); *Y10T 16/54026* (2015.01)

(58) Field of Classification Search
CPC .. E05D 3/122; E05D 11/1007; B60N 2/2213; B60N 2/2251; B60N 2/235; B60N 2/2352; B60N 2/2356; B60N 2/24; B60N 2/224; Y10T 16/5323; Y10T 16/54024; Y10T 16/540243; Y10T 16/541; Y10T 16/54026; F16C 11/10; B63B 29/04; B63B 2029/043
USPC ............ 16/239, 324, 325, 333, 354; 297/362, 297/366, 367 R, 368, 369
See application file for complete search history.

(56) References Cited

U.S. PATENT DOCUMENTS

| 3,710,418 | A | * | 1/1973 | Kratzer ........................... 16/325 |
| 3,953,069 | A | * | 4/1976 | Tamura et al. ............ 297/367 R |
| 4,295,682 | A | * | 10/1981 | Kluting et al. ............ 297/367 R |
| 4,384,744 | A | * | 5/1983 | Barley ....................... 297/367 R |
| 4,657,303 | A | * | 4/1987 | Croft ............................... 297/362 |
| 4,836,608 | A | * | 6/1989 | Sugiyama ................ 297/367 R |
| 5,322,346 | A | * | 6/1994 | Notta et al. ............... 297/367 R |
| 6,085,386 | A | * | 7/2000 | Blanchard et al. .............. 16/325 |
| 6,120,098 | A | * | 9/2000 | Magyar et al. ............ 297/367 R |
| 6,328,382 | B1 | * | 12/2001 | Yamashita ................ 297/367 R |

(Continued)

*Primary Examiner* — William Miller
(74) *Attorney, Agent, or Firm* — Robert M. Schwartz (57) ABSTRACT

A hinge and bracket system for a cushion seat back is provided. A bracket is attached to the side of a cushion seat back which is laying flat. The bracket is connected to a rotatable shaft, which in turn is connected to a toothed gear and a pawl. When the cushion seat back is raised upward, the toothed gear and an element of the pawl allow the cushion seat back to ratchet upwards, with the capability to lock the cushion seat back at any tooth. When the cushion seat back is raised above about 90 degrees, the pawl is forced to disengage from the toothed gear and the cushion seat back is unlocked and can be placed back in the original flat position. This hinge and bracket system may be employed in marine operations, especially for water skiing.

9 Claims, 11 Drawing Sheets

(56) References Cited

U.S. PATENT DOCUMENTS

| | | | |
|---|---|---|---|
| 7,328,954 B2 * | 2/2008 | Sasaki et al. | 297/378.12 |
| 8,070,231 B2 * | 12/2011 | Kienke et al. | 297/367 R |
| 8,104,141 B2 * | 1/2012 | Yamashita | 16/239 |

* cited by examiner

HINGE EMPLOYING A RATCHET FOR AN UPHOLSTERY SEAT

CROSS REFERENCE TO RELATED APPLICATIONS

This application is a continuation-in-part application of co-pending U.S. patent application Ser. No. 14/138,435 filed Dec. 23, 2013, entitled A Hinge Employing A Ratchet For An Upholstery Seat, which claims the benefit of U.S. Provisional Application No. 61/740,615 filed on Dec. 21, 2012, entitled Ratchets for Upholstery Seat, the disclosures of the prior applications are incorporated by reference, in their entireties.

BACKGROUND OF THE INVENTION

The present invention is directed to a hinge which includes a ratchet and pawl to permit an element of upholstery to move from a flat zero degree position upwardly to about a 90 to 100 degree position. The element of upholstery being discussed is a cushion that folds up to form a back rest which is provided on the stern of a recreational watercraft. Current designs do not allow for easy adjustment of seat and cushion positions for usage in sunbathing, installing water-ski hardware, rear deck lounging.

BRIEF SUMMARY OF THE INVENTION

The present invention is directed to a ratchet mechanism and bracket to be affixed to a cushion seat back on the rear deck of a marine craft, to permit the cushion seat back to be adjusted into one of any of a plurality of positions for the comfort of the user. Although the instant ratchet mechanism is employed in a marine application, it is not limited solely to such an application. The instant structure may be used on any of a plurality of chaise lounge type recliners as well as any other related devices, recliners or seat backs, deck cushions on cruisers, interior lounge seats, and armrests. The disclosed invention is an improved hinge system that can work on or be mounted to any structure that is needed to adjust to various positions. Such structures without limitation could be for a hatch lid for a storage compartment, grill lids, any hinged devices, or for an engine rooms.

A toothed gear with a central aperture and a surrounding circular element has a plurality of teeth protruding radially outwardly along the circumference. A shaft is connected to a bracket and is secured in the central aperture of the toothed gear by a locking key. When the toothed gear rotates, the shaft rotates, moving the bracket and thus moving the cushion seat back. A specialized rotatable pawl has a first toothed portion for interacting with the gear teeth, a central pawl tongue located above the first tooth portion, and a second portion which is toothless. Depending on the rotation of the toothed gear, the pawl may lock the cushion seat back in an upright position, or allow the cushion seat back to move freely back to an initial position.

The current invention has a main gear with a plurality of ratchet teeth approximately every seven (7) degrees, which permits the cushion to be locked into a position seven (7) degrees apart from a previous position. Different embodiments of the ratchets for the upholstery seat can change this seven (7) degree separation by changing the number of teeth to be a greater number of a lesser number. The instant ratchet pawl system allows the upholstery which is affixed to the brackets and the spring ratchet pawls system to move upwardly from the deck with the ratchet engaged, moving 7 degrees for each tooth moved forward on the gear teeth until it reaches approximately 97 degrees.

At this point the release spring deactivates the ratchet system allowing the upholstery to return to the stern deck, where the spring activates the ratchet system again to allow the upholstery to be ratcheted back up to 97 degrees.

The invention is employed on the port and starboard side of the upholstery chair which permits the upholstery chair to move from a flat position to a locked position. A bracket portion proximal the hinge is secured to the deck to where it retains a fixed upholstery pad secured to the deck.

All of the elements of the invention are made of metal. Stainless steel, while expensive, may have a greater longevity, especially in salt water. In embodiments of the invention which are intended to be used on the land, other metals or even synthetic polymers may be employed.

Although the invention is illustrated and described herein as embodied as a hinge assembly for an upholstery seat, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE PREFERRED EMBODIMENT

Figure 1:
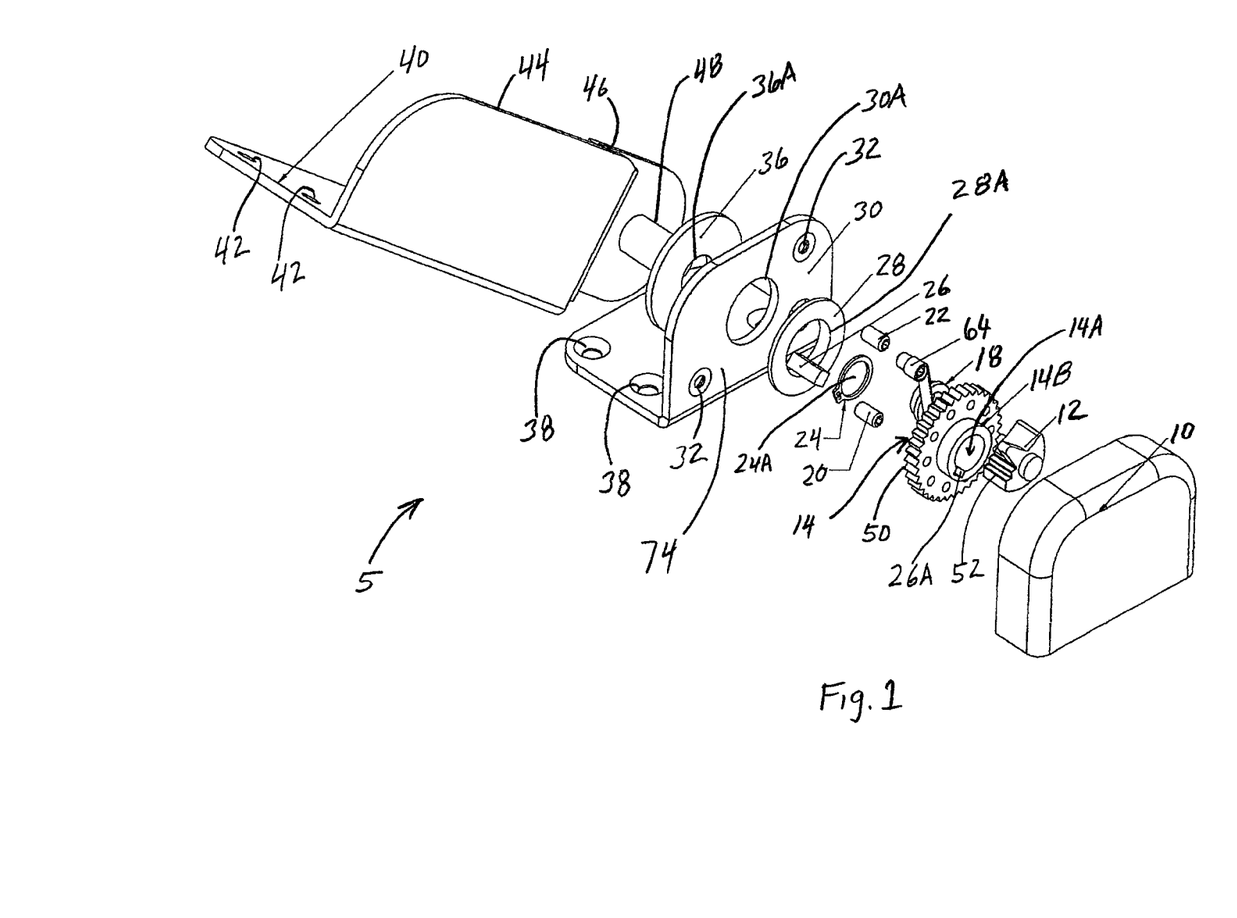
FIG. 1 is an exploded view of the pawl and ratchet spring hinge element of the invention in relation to the multiple brackets.
Figure 2:
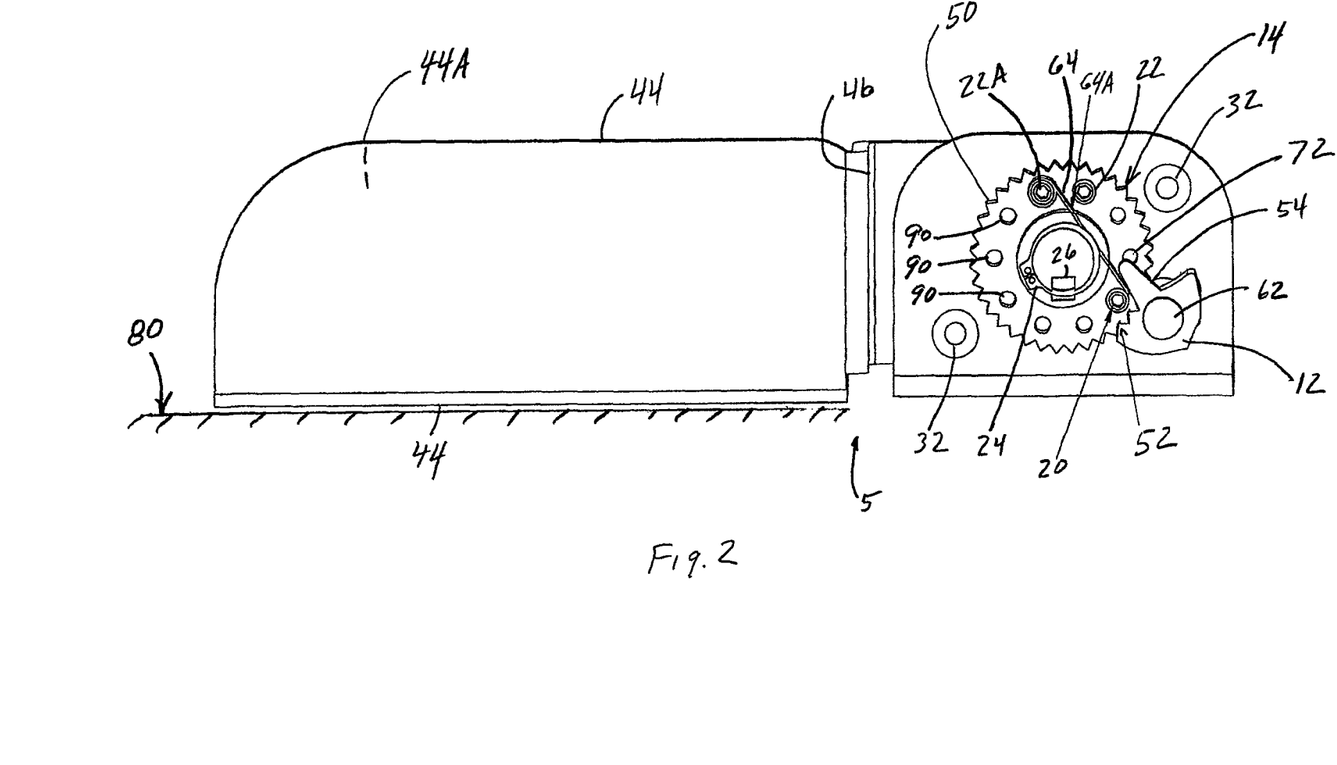
FIG. 2 is a view of the pawl and ratchet spring hinge element of the invention with the brackets shown in such a position so that if the movable upholstery were shown, it would be lying flat against the stern deck.

Referring to FIG. 1, an exploded view of the hinge employing a ratchet mechanism 5 for a movable upholstery seat or seat back 76 (best seen in FIG. 5) is shown. From right to left, a cover 10 is secured to the fixed mount bracket 30. Proximal the interior side of the cover 10 is the pawl 12, the pawl 12 has a first side 60 with teeth 52 and a second side 56 with no teeth as well as a pawl tongue 54 the circular element/main gear 14 has a plurality of teeth 50 radially disposed about a circumferential edge thereof. The ratchet mechanism 5 includes a ratchet spring hinge element 64, a first brass bearing 18, a first set screw 20, a second set screw 22, a snap ring 24, a shaft key 26, and a second brass bearing 28. The washer (preferably Delrin® a registered trademark of E.I. Dupont De Nemours and Company, Wilmington, Del.) 36 has a central circular opening 36A. This is immediately adjacent the central circular opening 30A of fixed mount bracket 30. Fixed mount bracket 30 includes a pair of bolt holes 32. The second brass bearing 28 has a central circular opening 28A immediately adjacent the central circular opening 36A. Intermediate the second brass bearing circular opening 28A is the snap ring 24 with a central circular opening 24A. The snap ring 24 with a central circular opening 24A is adjacent the first brass bearing 18 which has a circular opening (not shown). Shaft 48 inter fits down the cavity formed by the washer central circular opening 36A, the fixed mount bracket circular opening 30A, the second brass bearing central circular opening 28A, and through the snap ring central circular opening 24A and into the main gear central circular opening 14A. A key way 26A is formed parallel to the shaft 48 on the side of the central circular opening 14A. The shaft key 26 fits into the key way 26a securing the shaft to the main gear 14, and thus when the main gear 14 is caused to rotate with the pawl teeth 52 engaged to the gear teeth 50 of the main gear 14, the cushion support plate 44 rotates therewith. Perpendicular to the cushion support plate 44 is the backrest support 40, which includes a plurality of apertures 42 to secure an upholstery back portion or seat back 76 thereto. Main gear 14 has an annular shoulder 14B. The movement of the pawl teeth 52 against the gear teeth 50 allows the cushion support plate 44 to move in seven degree increments. This has the effect of rotating the upholstery back portion or seat back 76 at the same angular distance. FIG. 2 is a view of the pawl tongue 54, and ratchet spring hinge element 64 of the invention with the brackets shown in such a position so that if the movable upholstery 76 (see FIG. 5) were shown, it would be lying adjacent the rear of the movable cushion support plate 44 and lying flat against or in close proximity to the stern deck 80. In FIG. 2, the upholstery adjacent element 44A, would be at a zero angle with respect to the stern deck 80. The ratchet spring hinge element 64 is shown secured about a third set screw 22A with the ratchet spring hinge element extension 64A intermediate the set screw 20 and the pawl tongue 54. Spring extension 64A can rest against annular shoulder 14B. In this position, the pawl teeth 52 are shown inter-meshed with a portion of the gear teeth 50 of the main gear 14. A plurality of apertures 90 are located through the main gear 14 at approximately thirty degree intervals. The plurality of apertures 90 are located intermediate the gear teeth 50 and the main gear central circular opening 14A. The apertures 90 are designed to receive set screws or other devices therein in a different configuration than the first set screw 20 and the second set screw 22 as shown and located in FIGS. 2-4. This permits different angular displacement of the shaft 48, with the consequent different angular displacement of the upholstery attached to movable cushion support plate 44. The apertures 90 may also receive start-stop pins 72 in desired apertures 90 instead of the first set screw 20 and the second set screw 22, which pins 72 serve the same purpose as the set screws.

Figure 3:
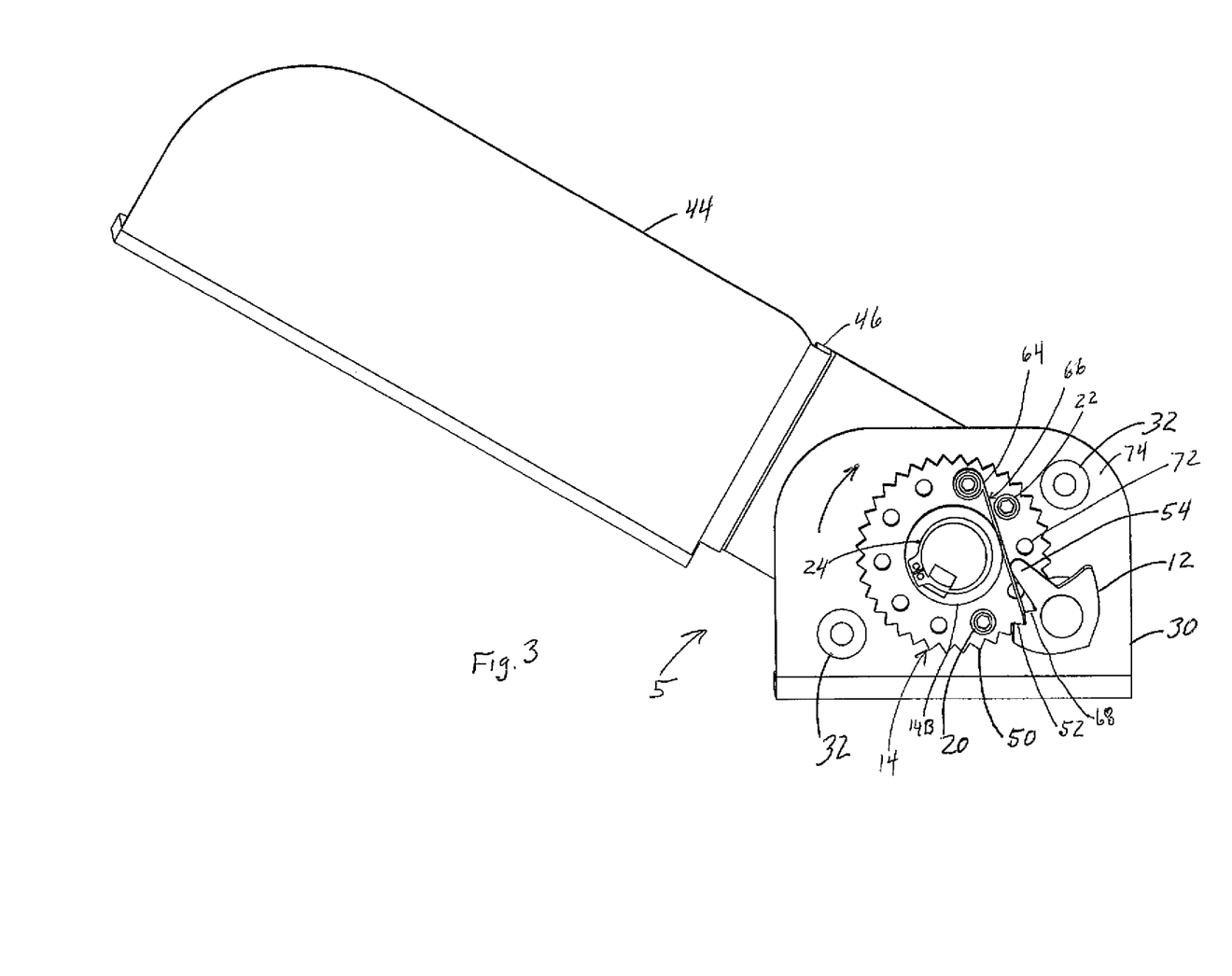
FIG. 3 is a view of the pawl and ratchet spring hinge element of the invention with brackets shown in such a position that if the movable upholstery were shown, it would be at about halfway between it's resting (zero degree) position and it's maximum approximate 97 degree position.

FIG. 3 is a view of the pawl tongue 54, pawl 12 and ratchet spring hinge element 64 of the invention with the cushion support plate 44 shown in such a position that if the movable upholstery were shown, it would be at about halfway between its resting (zero degree) position and its maximum 97 degree position. Since the upholstery is still moving upward, the pawl teeth 52 are still shown inter-meshed with a portion of the gear teeth 50 of the main gear 14.

FIG. 3 shows the ratchet spring hinge element 64 in a locked position 66 thereof. Further, the pawl teeth 52 are shown in their locked position 68. This keeps the backrest in a mid-locked position as shown. The main locking gear 14 is shown interfacing with the pawl 12. The configuration of the following components change as the seat back 76 is moved up and down. The components include the main gear 14, pawl 12, the ratchet spring hinge element 64 and the ratchet spring hinge element extension 64A orientation. This occurs when the upholstery 76 (see FIG. 5) secured to the cushion support plate 44 is moved to approximately the (42-49) degree position. This is due to the fact that the pawl teeth 52 have permitted the main gear 14 to rotate in 7 degree increments, causing the shaft 48 to rotate approximately 42-49 degrees and move the support plate 44. In this position, the pawl teeth 52 are still shown inter-meshed with a portion of the gear teeth 50 of the main gear 14.

Figure 4:
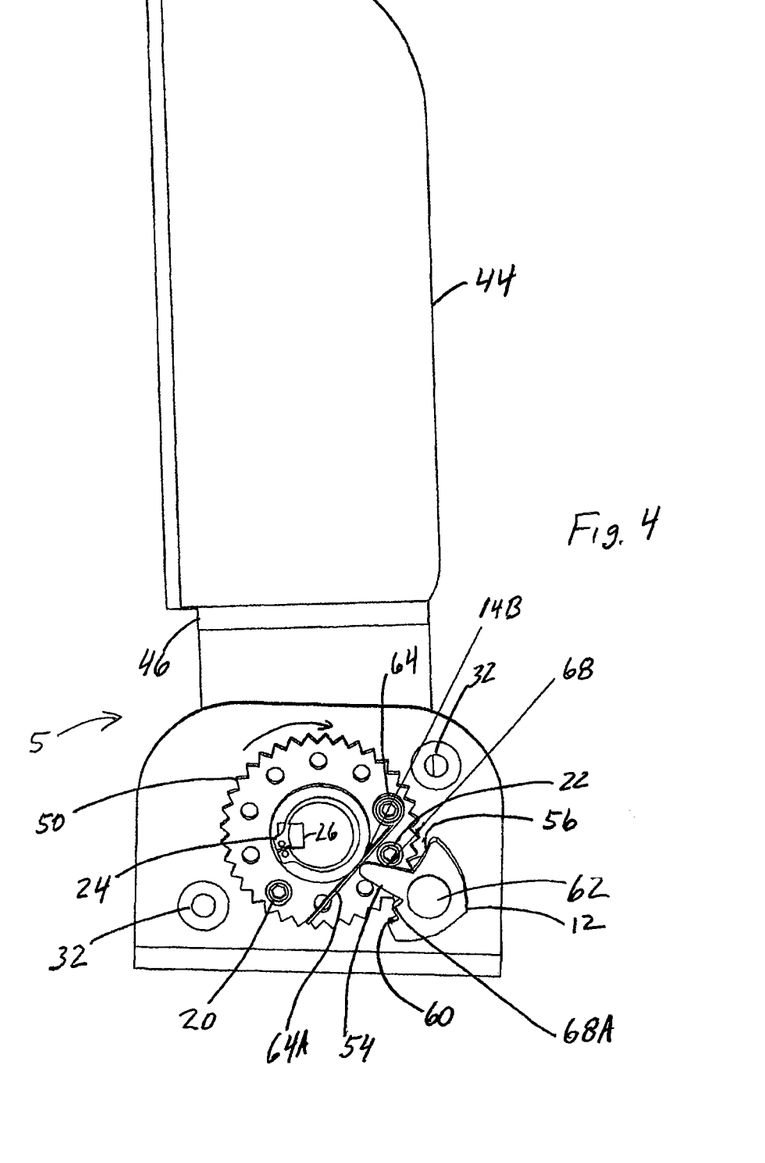
FIG. 4 is a view of the pawl and ratchet spring hinge element of the invention with the brackets shown in such a position that if the movable upholstery were shown, it would be at it's maximum elevation (approximately 97 degrees) with respect to the stern deck.

FIG. 4 is a view of the pawl 12 and ratchet spring hinge element 64 of the invention with the brackets shown in such a position that if the movable upholstery were shown, it would be at its maximum elevation (approximately 97 degrees) with respect to the stern deck. It is at this point where the rotation of the main gear 14 disengages the pawl teeth 52 by rotating the pawl tongue to the left after hitting the second set screw 22. At this point the second pawl side 56 with no teeth is pushed closest to the gear teeth 50 which permits the main gear 14 and shaft 48 to rotate counterclockwise back to the zero angle position which is shown in FIG. 2. The movement of the pawl tongue 54 by the first set screw 20 and the second set screw 22 respectively allows engagement of the pawl teeth 52 with the gear teeth 50 and the subsequent disengagement of the pawl teeth 52 from the gear teeth 50. Disengagement of the pawl teeth 52 displaces the second pawl side 56 towards the gear teeth 50 which allows the pawl teeth 50 and subsequently the shaft 48 for the seat back 76 to rotate freely from the upright position of the seat back 76 and bracket 44 shown in FIG. 4. to the original position of the seat back 76 and bracket 44 in FIG. 2. FIG. 4 shows the ratchet spring hinge element 64 in a released position. Further, the pawl teeth 52 are shown in a release position 68a. At this point, the pawl teeth 52 are displaced by the pawl tongue 54 via the first set screw 20 to re-engage the gear teeth 50 of the main gear 14 and allow the upholstery seat 76 to move upward again at an approximate seven degree increment as the pawl teeth 52 ratchet the gear teeth 50. This allows the backrest to be secured into a comfortable position.

Figure 5:
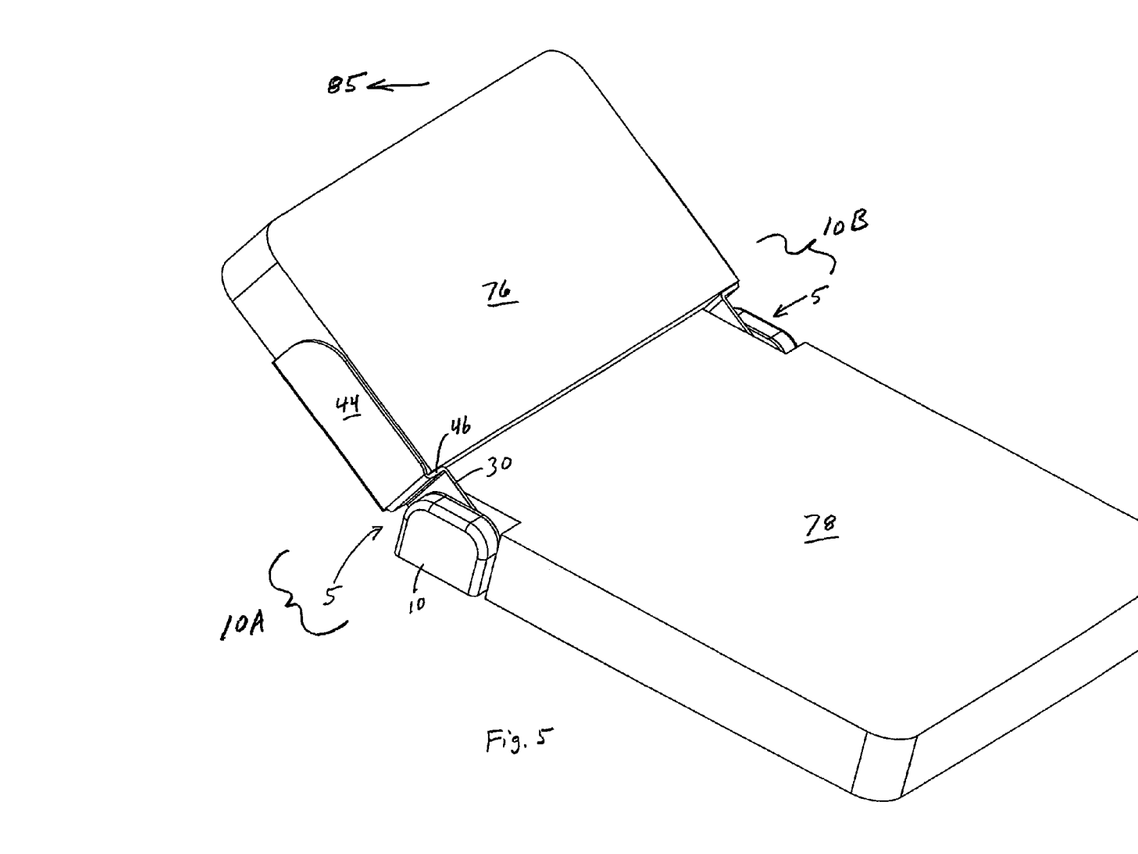
FIG. 5 is a perspective view of movable upholstery secured by the spring hinge elements of the invention at an approximate level as that shown in FIG. 3.

FIG. 5 shows the upholstery seat back 76 being supported in an upright position by a first hinge 10A, including ratchet mechanism 5 and bracket 30 and a second hinge 10, including further ratchet mechanism 5 and bracket 30. Cover element 10 as shown in FIG. 1 encloses the pawl 12, the pawl tongue 54 the main gear 14, and all other interior mechanisms. A portion of fixed mount bracket 30 is shown with the bend 46 in the cushion support plate 44. The bend 46 in the cushion support plate 44 moves the cushion support plate 44 outwardly from the fixed mount bracket 30 (best seen in FIG. 1) to permit motion of the cushion support plate 44. In FIG. 5 the cushion or movable upholstery 76 is shown in a position which would be actualized by the view of the hinge, ratchets, and brackets shown in FIG. 2. Four apertures 38 (of which only two are shown in FIG. 1) are located on the fixed mount bracket 30 are employed with mechanical fasteners to fix the entire assembly to a deck.

FIG. 5 also shows fixed cushion 78 which can be attached to the deck proximal the rear of the boat. Arrow 85 shows the orientation of the movable cushion 76 and fixed cushion 78 with respect to the front of the boat or other craft.

Figure 6:
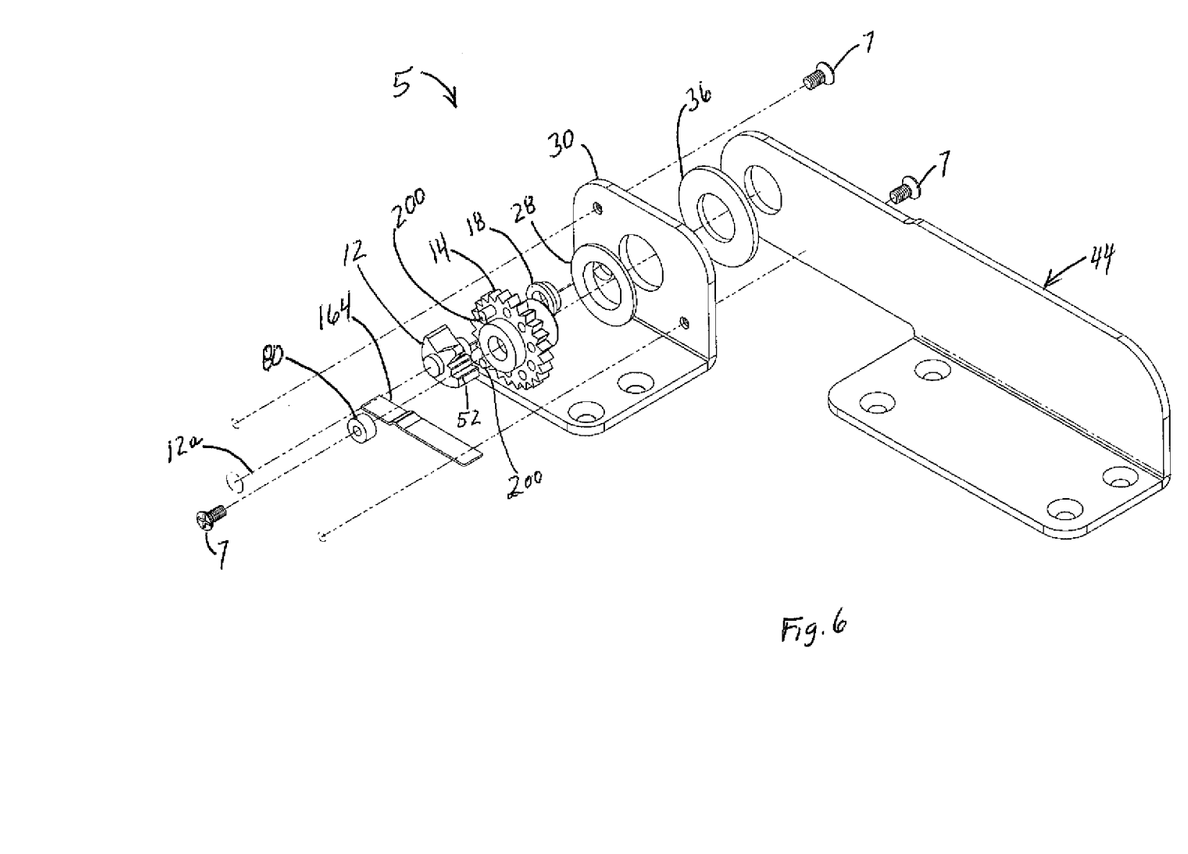
FIG. 6 is an exploded perspective view of another embodiment of the hinge including the ratchet mechanism.
Figure 11:
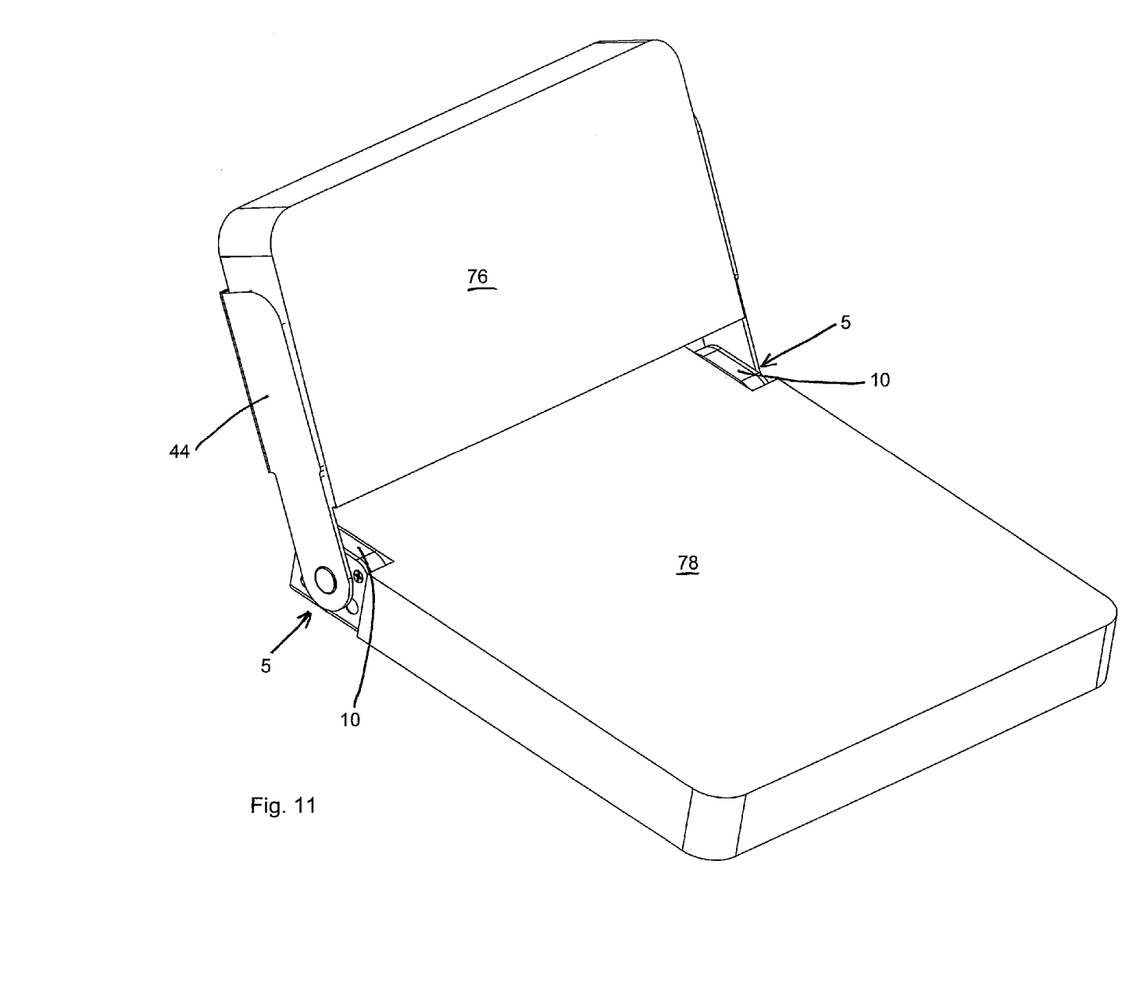
FIG. 11 is a perspective view of movable upholstery secured by the spring hinge elements of the invention

FIG. 6 shows another embodiment in which the spring action for holding the pawl 12 in the correct positions is achieved with a variation of the spring 164 and the disposition thereof. The embodiment of FIG. 6 also combines elements in order to eliminate some components and make the assembly easier to produce. Also, the cushion support plate 44 has been flipped so that the cushion support 40 faces the hinge and the bend 46 of the first embodiment is removed. The configuration of the elements is further shown in FIG. 11, which shows the cover 10 facing the fixed cushion 78, which is opposite FIG. 5.

FIG. 6 shows that the mount bracket 30 receives the main gear 14 with the second brass bearing 28 disposed therebetween. In FIG. 6, the main gear 14 is of one piece construction, which eliminates the requirements for the shaft key 26 and the snap ring 24. The pawl 12 is held at the mount bracket 30 by the first brass bearing 18. The pawl 12 includes the first side 60 and the second side 56 with respect to the tongue 54, when viewing the pawl 12 along an axis of rotation of the pawl 12. The main gear 14 includes activation pins 200, which are disposed in apertures 90. If adjustability of the range of motion of the seat back 76 is not a concern, the activation pins 200 may be formed as part of the main gear 14 in order to increase the cross sectional area thereof and increase the strength of the activation pins 200. In other words, the activation pins would not have to be round and could have an arc-shaped cross-section. The activation pins 200 establish the range of motion of the seat back 76 by controlling engagement of the pawl 12 with the main gear 14. While the elements 200 are designated as pins, it is certainly possible for the activation pins 200 to be provided as set screws as is the case in the embodiment shown in FIG. 1. The tongue 54 can be any type of actuating projection or surface on the pawl 12 that is able to engage the activation pins to move the pawl 12.

A brass bushing 80 having female threads guides the main gear 14 on a cover side of the main gear 14. The bushing 80 receives a screw 7, which holds the bushing 80 to the cover 10.

Figure 9:
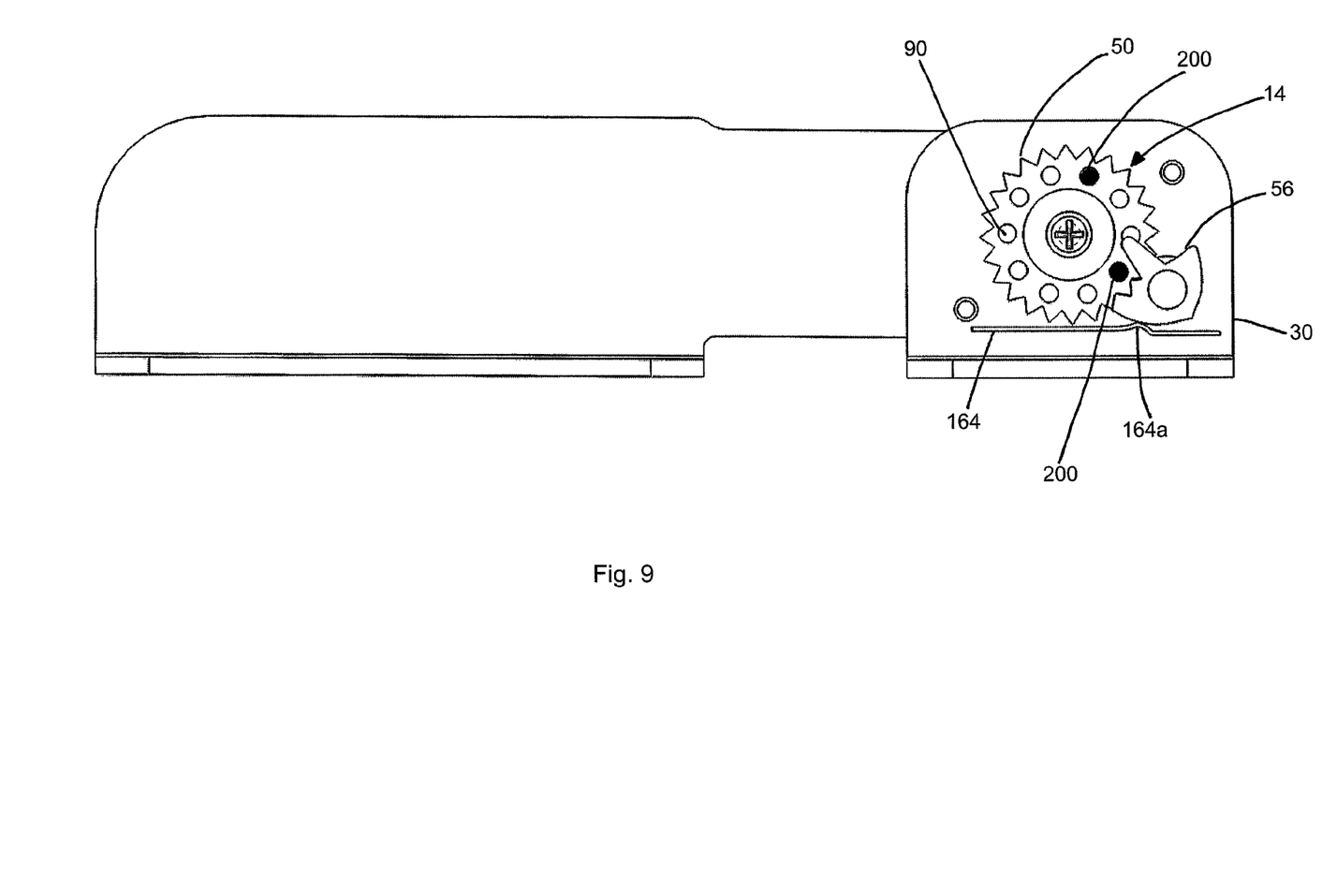
FIG. 9 is a side view showing the main gear moving in a direction away from the stop pin which engage the pawl with the main gear 14.
Figure 10:
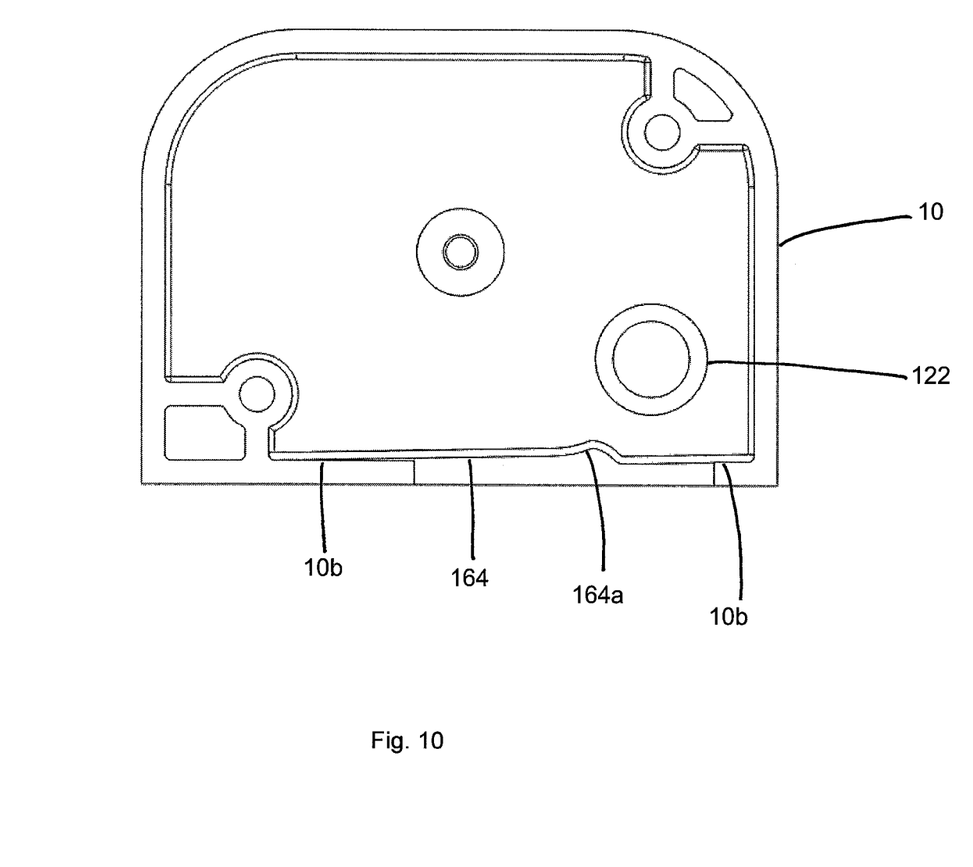
FIG. 10 is a side view showing an inside of the cover holding the spring in position.

As seen in FIG. 10, the cover 10 defines ledges 10b, which hold the spring element 164 in a proper position to interact with the pawl 12 and allow for the ratcheting of the pawl teeth 52 in the teeth 50 of the main gear 14. The spring element also holds the pawl 12 in a free-wheeling position once the teeth 52 have been disengaged from the teeth 50 of the main gear 14 and the second side 56 being moved adjacent said main gear 14 due to interaction of the pawl tongue 54 with the appropriate stop pin 200. The spring 164 in the embodiment of FIG. 6 is provided as a strip. The ledges 10b support the spring 164 at opposite ends thereof and allow deflection of the spring 164 at a bend 164a between the opposite ends of the spring 164, where the spring 164 interacts with the pawl 12. The cover 10 also includes a blind hole 10c at the axis of rotation 12a which supports the pawl 12 on the cover side of the pawl 12. FIG. 6 shows screws 7 which fasten the mount bracket 30 to the cover 10. It noted the cover is removed from FIGS. 7-9 and therefore, the ledges which support the spring 164 are not seen in FIGS. 7-9. Although the ledges 10b are shown as part of the cover 10, it is possible for the ledges 10b to be provided on the mount bracket 30.

Figure 7:
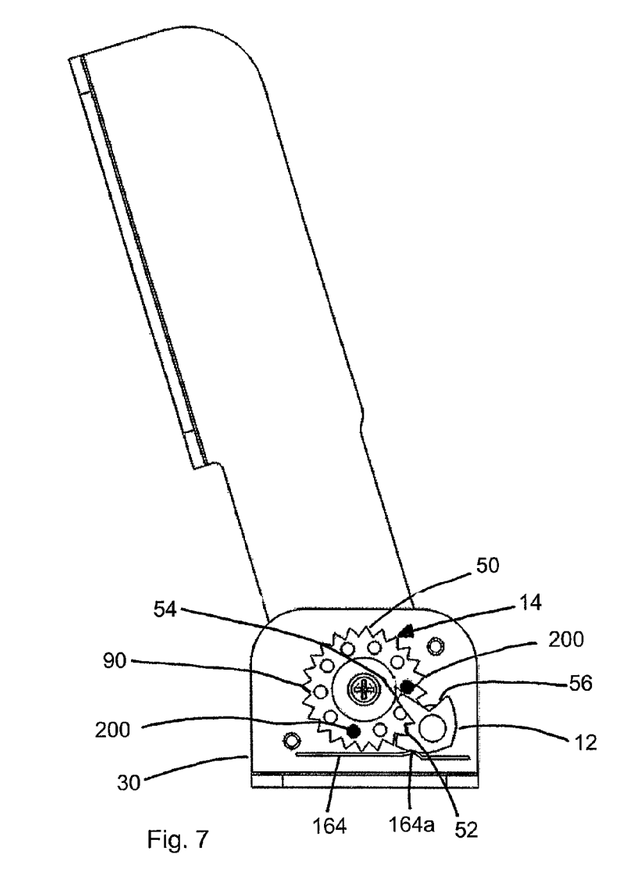
FIG. 7 is a side view showing the main gear moving in a ratcheting direction approaching the release position of the pawl.
Figure 8:
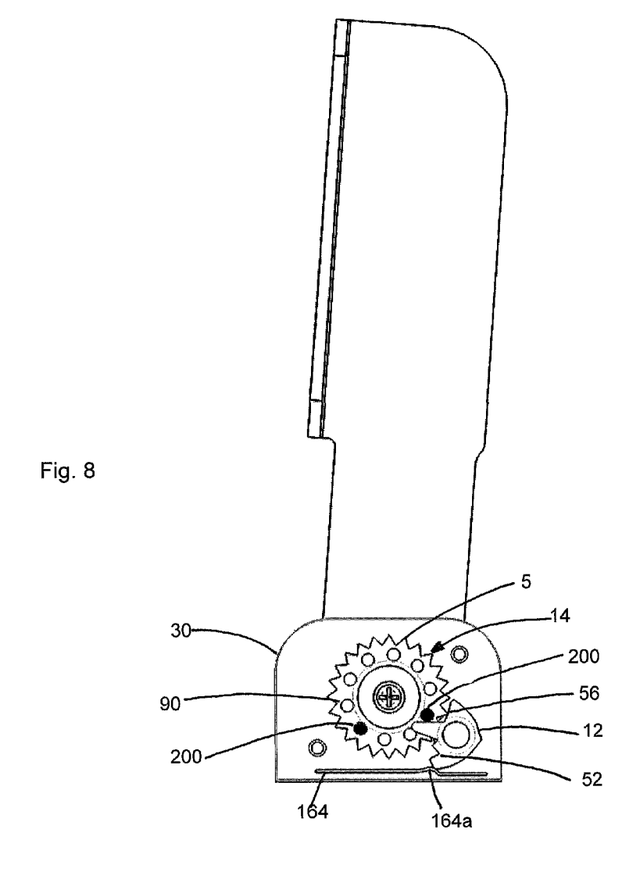
FIG. 8 is a side view showing the pawl being disengaged by the stop pin.

The operation of the ratchet mechanism 5 will be discussed with respect to FIGS. 7, 8, and 9. The activation pins 200 serve to control the location of the pawl 12 (ratcheting/free-wheeling) by interaction with the pawl 12, particularly, the pawl tongue 54. Although the embodiment of FIG. 6 has different structure with respect to the spring element 164, the description of the operation of FIG. 6 also generally applies to the embodiment of FIG. 1 in the manner which the spring allows the pawl 12 to be positioned. FIGS. 7-9 show that the pawl 12 is disposed in a position between the activation pins 200.

FIG. 7 shows the seat back 76 moving in the ratcheting direction (clockwise in FIG. 7) towards the adjacent activation pin 200 with the pawl teeth 52 and the main gear teeth 50 in engagement. As the seat back 76 is raised and the pawl ratcheted, the spring 164 deflects and allows the pawl 12 to pivot to let the teeth 50 and 52 pass over one another to the next ratchet position. As the movement continues, the pawl tongue 54 comes into contact with the activation pin 200 and causes the pawl teeth 52 to disengage from the main gear teeth 50. The pawl 12 is rotated by the activation pin 200 until the pawl 12 is held by the spring 164 in a release position released from the main gear 14. The release position is where the second side 56 is moved toward the main gear 14 and since no teeth are present on the second side 56 and clearance is present between the pawl 12 and the main gear 14, the main gear 14 is able to free-wheel. In the embodiment of FIG. 6, the pawl 12 is held in the release position at the bend 164a of the spring 164, which is shown in FIG. 8. It is at this point that the main gear 14 can free-wheel to put the seat back in a flat position. At the flat position, the other activation pin 200 contacts the pawl tongue 54 and rotates the pawl 12 so that the pawl teeth 52 once again engage the main gear teeth 50. FIG. 9 represent a point just after the pawl teeth 52 and the main gear teeth 50 are re-engaged and the seat back 76 is being moved is a raising direction and the spring 164 holds the pawl 12 in a position where the pawl teeth 52 are able to ratchet in the main gear teeth 50.

The present invention is a hinge system, for a cushion seat back on a boat which may be used for water skiing, having a shaft with a first end and a second end, where the shaft first end is connected to a bracket, where the bracket is affixed to a cushion seat back, and the cushion seat back is initially in a flat position at the rear of the boat. The shaft second end is secured by a locking key in a central aperture of a main gear, this main gear having a radius and a circumference, as well as a plurality of teeth equally distributed radially outward about the circumference of the main gear.

A plurality of apertures pass through the main gear, these plurality of apertures are equidistant from one another, and the plurality of apertures are intermediate the central radius of the main gear and the plurality of teeth which radially surround the circumference of the main gear.

The hinge system of this invention further includes a pawl with a tongue, where the pawl is rotatably fixed proximal the plurality of teeth, which radially surround the circumference of the main gear. The pawl has a lower portion and an upper portion, and the lower portion has several teeth, while the upper portion has no teeth.

The hinge system of the invention further includes a first set screw and a second set screw, where the first set screw fixed in one of the plurality of apertures above upper portion of the pawl. The second set screw fixed in a second one of the plurality of apertures below lower portion of the pawl. The invention further includes a spring having a body and an elongated tail, where the spring body is fixed in the one of the plurality of apertures above and adjacent the first set screw, and the elongated tail traverses from the spring body to a position above and in contact with the second set screw. In this configuration, the several teeth of the lower portion of the pawl are inter-meshed with an equal number of the plurality of teeth of the main gear and when the cushion seat back is lifted up from an initial flat position, the shaft rotates the main gear, and several teeth of the pawl are displaced from the equal number of the plurality of teeth of the main gear to a second set of a plurality of teeth on the main gear which locks the seat back at a second position equal to the position where said cushion seat back was lifted.

Additionally, when the cushion seat back is lifted up from any position to a position above about 90 degrees, the spring rotates or urges the pawl tongue downward, disengaging the several teeth of the pawl which are inter-meshed with an equal number of the plurality of teeth of the main gear and thus moves the upper portion of the pawl to a position proximal the plurality of the teeth of the main gear, permitting the cushion seat back to be moved back to an initial flat position.

We claim:

1. A hinge assembly comprising:
   a main gear having main gear teeth distributed about a circumference thereof, said main gear having a first activation pin and a second activation pin disposed thereon and radially spaced apart from one another;
   a pawl having a tongue and pawl teeth, said pawl being disposed to rotate and disposed in a position in relationship with said main gear allowing said pawl teeth to engage with said main gear teeth, said pawl having a region adjacent said pawl teeth having clearance to said main gear teeth;
   a spring disposed in contact with said pawl for holding said pawl teeth in ratcheting engagement with said main gear teeth, said spring being disposed for holding said pawl in a free-wheeling position where said pawl teeth are disengaged from said main gear teeth and said region is rotated to a position opposite said main gear teeth.

2. The hinge assembly according to claim 1, further comprising a mount bracket, said main gear and said pawl being rotationally mounted in said mount bracket.

3. The hinge assembly according to claim 2, further comprising a cover being releasably mounted on said mount bracket.

4. The hinge assembly according to claim 3, wherein said cover has ledges formed thereon for supporting said spring and providing clearance on a backside of said spring to allow said spring to deflect in a direction away from said pawl.

5. The hinge assembly according to claim 4, wherein said spring has a bend formed therein, said bend interacting with said pawl.

6. The hinge assembly according to claim 3, further comprising a bushing mounted on said cover, said bushing supporting said main gear on a cover side of the hinge assembly.

7. The hinge assembly according to claim 1, wherein said first activation pin engages said tongue to move said pawl into said free-wheeling position and said second activation pin engages said tongue to move said pawl teeth into ratcheting engagement with said gear teeth.

8. A hinge assembly comprising:
   a main gear having main gear teeth distributed about a circumference thereof, said main gear having a first activation pin and a second activation pin disposed thereon and radially spaced apart from one another;
   a pawl having pawl teeth, said pawl being disposed to rotate and disposed in a position in relationship with said main gear allowing said pawl teeth to engage with said main gear teeth, said pawl having a region adjacent said pawl teeth having clearance to said main gear teeth;
   a spring disposed in contact with said pawl for holding said pawl teeth in ratcheting engagement with said main gear teeth, said spring being disposed for holding said pawl in a free-wheeling position where said pawl teeth are disengaged from said main gear teeth and said region is rotated to a position opposite said main gear teeth.

9. A hinge system comprising:
   a main gear, having a plurality of teeth distributed about a circumference thereof;
   said main gear having apertures formed therein;
   a pawl with a tongue, said pawl rotatably fixed proximal said plurality of teeth;
   said pawl having a first portion and a second portion, said first portion having pawl teeth said second portion having clearance to said plurality of teeth;
   a first stop and a second stop, said first stop fixed in one of said apertures above said second portion;
   said second stop fixed in a second one of said apertures below said second portion;
   a spring having a body and an elongated tail, said body fixed in one of said apertures adjacent said first stop, said elongated tail traversing from said spring body to a position in contact with said second stop.

* * * * *